United States Patent

Bawa et al.

[11] Patent Number: 6,071,439
[45] Date of Patent: Jun. 6, 2000

[54] TREATMENT OF CONTACT LENSES WITH SUPERCRITICAL FLUID

[75] Inventors: Rajan S. Bawa, Ft. Worth, Tex.; Frank Tasber, Henrietta; Dennis Hahn, Rochester, both of N.Y.

[73] Assignee: Bausch & Lomb Incorporated, Rochester, N.Y.

[21] Appl. No.: 08/936,944

[22] Filed: Sep. 23, 1997

Related U.S. Application Data

[62] Division of application No. 08/189,347, Jan. 31, 1994, abandoned.

[51] Int. Cl.[7] .................................................. B29D 11/00
[52] U.S. Cl. ........................... 264/1.1; 134/31; 264/2.6; 264/85; 264/334; 264/344; 528/480; 528/483
[58] Field of Search ............................. 264/1.1, 2.6, 334, 264/83, 85, 344, 336, 1.36, 1.38; 528/480, 483, 491; 134/31, 42

[56] References Cited

U.S. PATENT DOCUMENTS

| | | |
|---|---|---|
| 3,408,429 | 10/1968 | Wichterle . |
| 3,496,254 | 2/1970 | Wichterle . |
| 3,806,619 | 4/1974 | Zosel ........................................ 426/478 |
| 4,084,459 | 4/1978 | Clark . |
| 4,153,641 | 5/1979 | Deichert et al. . |
| 4,197,266 | 4/1980 | Clark et al. . |
| 4,731,208 | 3/1988 | Nakajima et al. ...................... 264/344 |
| 4,740,533 | 4/1988 | Su et al. ................................. 523/106 |
| 4,873,218 | 10/1989 | Pekala ..................................... 502/418 |
| 4,882,107 | 11/1989 | Cavender et al. ...................... 264/175 |
| 5,028,363 | 7/1991 | Nishio et al. ............................ 264/344 |
| 5,034,461 | 7/1991 | Lai et al. ................................ 525/100 |
| 5,035,847 | 7/1991 | Nishio et al. ............................. 264/86 |
| 5,047,647 | 9/1991 | Al-Ghatta . |
| 5,070,215 | 12/1991 | Bambury et al. ....................... 556/418 |
| 5,081,163 | 1/1992 | Pekala ..................................... 521/187 |
| 5,086,085 | 2/1992 | Pekala ..................................... 521/187 |
| 5,167,883 | 12/1992 | Takemasa et al. ........................ 264/85 |
| 5,227,239 | 7/1993 | Upadhye et al. . |
| 5,242,647 | 9/1993 | Poco ....................................... 264/344 |
| 5,264,161 | 11/1993 | Druskis et al. .......................... 264/2.3 |
| 5,287,632 | 2/1994 | Heit et al. ................................... 34/9 |
| 5,294,379 | 3/1994 | Ross et al. .............................. 264/2.3 |
| 5,306,350 | 4/1994 | Hoy et al. ........................... 134/22.14 |
| 5,339,844 | 8/1994 | Stanford, Jr. et al. ................. 134/107 |
| 5,456,759 | 10/1995 | Stanford, Jr. et al. ..................... 134/1 |
| 5,470,474 | 11/1995 | Ansorge et al. ................... 210/500.23 |
| 5,607,518 | 3/1997 | Hoffman et al. .......................... 134/31 |

FOREIGN PATENT DOCUMENTS

| | | | |
|---|---|---|---|
| 412053 | 2/1991 | European Pat. Off. ............... 264/344 |
| 483310 | 12/1981 | France .................................... 264/2.6 |
| 2414928 | 6/1975 | Germany . |
| 133929 | 10/1980 | Japan ..................................... 264/2.6 |
| 91/09079 | 6/1991 | WIPO . |
| 96/26059 | 8/1996 | WIPO . |

OTHER PUBLICATIONS

Patent Abstracts of Japan, vol. 18, No. 241 (p–1733), May 9, 1994 & JP,A,60 027424 (Hogi Tsuneo) Feb. 4, 1994.

*Primary Examiner*—Matthieu D. Vargot
*Attorney, Agent, or Firm*—John E. Thomas

[57] ABSTRACT

A method of treating contact lenses made from polymerizable materials by providing supercritical fluids to the lenses.

14 Claims, No Drawings

TREATMENT OF CONTACT LENSES WITH SUPERCRITICAL FLUID

This is a divisional of application Ser. No. 08/189,347 filed on Jan. 31, 1994, now abandoned.

BACKGROUND OF THE INVENTION

This invention relates to improved methods of manufacturing or processing contact lens materials employing a supercritical fluid.

Polymerized contact lens materials must not only have sufficient optical clarity, but also must be suitable for contact with the eye for extended periods. The contact lenses made from such materials must be sufficiently hydrophilic at the lens surface to properly "wet". Wetting is the characteristic understood to relate to the contact lens' ability to be lubricated by the eye's natural tears so that the lens may move freely over the eye during its use. This freedom of movement over the eye keeps the lens from adhering to the eye and allows a continuous stream of tears to wash under and over the lens, resulting in maximum comfort.

The ability of a lens to properly wet and be "comfortable" in the eye is difficult to predict. Much work in the field has been directed to achieving and maintaining a hydrophilic environment or the contact lens surface. Incorporation of a variety of hydrophilic monomers into the monomer mix, as well as post-treatments such as plasma treatments have been attempted, with some success, to maintain hydrophilicity at the lens surface. However, attempts to improve and maintain adequate hydrophilicity must not compromise the other important lens characteristics, such as optical clarity. Conversely, attempts to improve or retain a high degree of optical clarity, oxygen permeability, tear strength, etc., while maintaining the proper modulus, must not adversely affect the lens' wetting capabilities.

A method of lens treatment which would not adversely affect the lens' wetting or other physical characteristics, but which could improve the lens' optical clarity would be desirable. In addition, a lens treatment which could improve the hydrophilicity of a lens, thereby eliminating or at least reducing the need for additives or post-treatment would be advantageous.

Because of certain processing limitations, most soft hydrogel contact lens production results in a molded lens which must be handled, inspected and shipped in a wet state. This processing limitation adds time and cost to the overall lens production. However, a cost-effective lens treatment which could produce a dry lens could simplify lens production and reduce the cost of lenses.

It will also be appreciated that large-scale manufacturing processes require disposal of relatively high volumes of the extraction solutions used to remove impurities and residual materials (sometimes referred to as residuals or extractables) from the lenses. In addition, various materials used as solvents provide potentially hazardous conditions to working environments due to material toxicity to humans or flammability, for example. An extraction technique using a non-toxic, preferentially recyclable extraction solvent would be desirable.

SUMMARY OF THE INVENTION

The present invention provides methods of treating contact lenses and contact lens materials. More specifically, in one aspect of the invention, a method of treating a contact lens material is disclosed comprising treating the contact lens material with a supercritical fluid.

In another aspect of the invention a method of producing an optically clear contact lens is disclosed comprising treating the contact lens with a supercritical fluid.

In a still further aspect of the invention a method of dry releasing a contact lens from a mold in which the lens was molded is disclosed, comprising treating the contact lens and mold with a supercritical fluid.

In yet another aspect of the present invention, a method of extracting incompletely polymerized materials from a contact lens is disclosed comprising treating the contact lens with a supercritical fluid.

DETAILED DESCRIPTION OF THE INVENTION

A gas is considered to be in a supercritical state when it is subjected to such a combination of pressure and temperature that its density approaches that of a liquid (where a liquid and gas state coexist). When a gas is subjected to such conditions, it is called a supercritical fluid (SCF). It has now been discovered that exposing a contact lens to supercritical carbon dioxide ($CO_2$) produces a contact lens with enhanced optical clarity. It was also discovered that supercritical fluids could extract the unreacted or incompletely polymerized material in the polymeric structure of various contact lens materials.

Carbon dioxide is a preferred candidate for supercriticality since its critical temperature is 31° C. A gas' critical temperature is the temperature at which a change in phases takes place causing an appreciable change in the gas' physical properties. While all of the experimentation discussed below was conducted with $CO_2$ it is understood that many other gases under supercritical conditions may be used to treat contact lens polymeric materials, including supercritical nitrous oxide ($N_2O$), ethane and propane, or a combination thereof.

As is known in the field of supercritical fluids, the solubility of a particular solid in a SCF depends upon the density and polarity of the SCF. Therefore, when a supercritical fluid is to be used to extract a particular component from a material, the specific solubility of the component must be experimentally determined.

For the extraction of incompletely polymerized residual material from contact lens materials, it has now been determined that the $CO_2$ should be pressurized to from about 1000 psi to about 4000 psi, and is preferably from about 2000 psi to about 4000 psi when the temperature is kept within the range of from about 40° C. to about 90° C., and preferably from about 50° C. to about 80° C., Generally, in the manufacture of contact lenses, some of the monomer mix is not fully polymerized. The incompletely polymerized material from the polymerization process may affect optical clarity or may be harmful to the eye. Residual material may include solvents or unreacted monomers from the monomeric mixture, or oligomers present as by-products from the polymerization process.

The residual material may be hydrophilic or hydrophobic. Conventional methods to extract such residual materials from the polymerized contact lens material include extraction with water (for extraction of hydrophilic residual material) or an alcohol solution (for extraction of hydrophobic residual material). However, some of the alcohol extraction solution remains in the polymeric network of the polymerized contact lens material, and must also be extracted from the lens material before the lens may be worn safely and comfortably on the eye. This requires an additional extraction of the alcohol from the lens, generally using heated water for up to 4 hours or more. Frequently, however, the conventional methods may not adequately remove the residual material.

Contact lens materials are formed from the polymerization product of a mixture of monomers or prepolymers. (For purposes of convenience, the term "monomer" as used hereafter shall include prepolymers.) The monomeric mixture may also include materials other than monomers that aid in the polymerization process, such as a solvent or a diluent. Contact lens materials include materials for "hard" and "soft" lenses. The hard lens classification typically includes lenses such as rigid gas permeable (RGP) contact lenses, which are generally formed of crosslinked silicone acrylate or fluorosilicone acrylate copolymers. Soft lenses include "soft" hydrogel contact lenses. Hydrogels are hydrophilic polymers that absorb water to an equilibrium value and are insoluble in water due to the presence of a crosslinked three-dimensional network. Hydrogels are generally formed of a copolymer of at least one hydrophilic monomer and a crosslinking monomer. The oydrophilicity is due to the presence of hydrophilic groups, such as alcohols, carboxylic acidsr, amides and sulfonic acids. The swollen equilibrated state results from a balance between the osmotic driving forces that cause the water to enter the hydrophilic polymer and the forces exerted by the polymer chains in resisting expansion. In the case of silicone hydrogel contact lenses, the copolymeric material further includes a silicone-containing monomer. Lenses in this class are generally formed of a copolymer of at least one hydrophilic monomer and a crosslinking monomer. Hydrophilic monomers include: unsaturated carboxylic acids, such as methacrylic acid and acrylic acid; (meth)acrylic substituted alcohols or glycols, such as 2-hydroxyethylmethacrylate, 2-hydroxyethylacrylate, glyceryl methacrylate, and polyethyleneglycol methacrylate; vinyl lactams, such as N-vinyl-2-pyrrolidone; and acrylamides, such as methacrylamide and N,N-dimethylacrylamide. Further examples of such hydrophilic monomers can be found in U.S. Pat. Nos. 4,153,641; 4,740,533; 5,034,461; and 5,070,215.

The crosslinking monomer may be a material having multiple polymerizable functionalities, preferably vinyl functionalities. Representative crosslinking monomers include: divinylbenzene;

allyl methacrylate; ethyleneglycol di(meth)acrylate, tetraethyleneglycol di(meth)acrylate, polyethyleneglycol di(meth)acrylate; and vinylcarbonate derivatives of the glycol di(meth)acrylates. In the case of silicone hydrogel contact lenses, the copolymeric material further includes at least one silicone-containing monomer.

Extracting hydrogel lenses with solutions may restrict processing flexibility; the lenses must be processed, inspected and shipped in a "wet" state. From a manufacturing perspective, it may be desirable to package and ship hydrogel lenses in the dry state. However, known extraction methods frustrate the ability to package and ship hydrogel lenses in the dry state. As shown by the experiment outlined in Example 4 below, it was determined that a contact lens could be released from a lens-in-mold assembly in the dry state using supercritical $CO_2$. While the physical properties of the released lenses were not recorded, it is believed that supercritical fluid technology could be used to release the lens from its mold and have residuals extracted from the lens all in one step.

The incomplete extraction of residual material from lenses may contribute adversely to the useful life of the lens. It is thought that some residuals may not be fully extracted and may, over time, migrate through the polymeric network of the lens toward the surface. The residuals may impact lens performance and comfort by interfering with optical clarity or the desired uniform hydrophilicity of the lens surface. Therefore the use of supercritical $CO_2$ or other acceptable supercritical fluids will provide a more complete extraction of the contact lens material. Such an extraction would be highly preferable to known extraction protocols, and could result in a contact lens that is initially more hydrophilic, and which is able to remain hydrophilic for longer duration.

Supercritical fluids may further incorporate amounts of additional components for the purpose of enhancing the SCF's extraction efficiency. This is sometimes referred to as "spiking" the SCF. By adding a compound to the SCF, the specific properties of the SCF, including behavior as a solvent, may be favorably altered. In this way, a wider range of impurities or compounds may be extracted from the lens material. Any organic solvent may be placed in the chamber for the purpose of mixing with the SCF. Particularly useful compounds used for such SCF "spiking" include propanol, ethanol, methylene chloride and others as would be apparent to one skilled in the field of SCF technology.

If a contact lens is to remain comfortable for extended periods on the eye, the lens must properly wet. To achieve this wetting, lenses often incorporate hydrophilic monomers into the monomer mix in an attempt to increase and maintain uniform wetting on the lens surface. Contact lenses have also been post-treated to achieve proper wetting. Plasma treating of contact lenses has been investigated and has yielded lenses with enhanced wetting. Supercritical fluids were used to extract contact lenses both before and after plasma treating the lenses. See Example 3 below.

With respect to the extraction of residuals from contact lenses, solvents must be chosen by their ability to extract either hydrophilic, hydrophobic or both types of unreacted residual material from the polymeric structure. However, the solvent itself must be able to be removed or flushed from the polymeric structure. Even if a particular solvent can be flushed from the polymeric structure, it may adversely affect the structure in a way that leaves the lens appearing cloudy. It is important that the selected solvent in no way adversely affect the optical clarity of the lens. Optical clarity is subjectively understood to be the level of clarity observed when the lens is inspected. Trained inspectors in the field inspect contact lenses for their clarity. The lenses which had been extracted with supercritical $CO_2$ appeared at least as "optically clear" when viewed next to conventionally extracted contact lenses.

There is evidence shown in the following Examples that the supercritical $CO_2$ extracted residuals from the contact lenses, under certain conditions up to ten times, better than conventional isopropyl alcohol and water extractions. See Example 1, Table 1. It has been thought that lenses may lose their wetting properties and become more hydrophobic at the surface, over time, due to the leaching out of hydrophobic segments which were not satisfactorily extracted previously. It is possible that the enhanced extraction of residuals effected by the supercritical $CO_2$ may obviate the need to post-treat a lens. This could lead to both longer lasting and more comfortable lenses with excellent wetting properties. Such lenses would also require fewer processing steps which could greatly reduce cost.

It is contemplated that the SCF extraction may be incorporated into any contact lens manufacturing protocol, at any point in the protocol, although it is preferable that the SCF extraction take place as the final step in the process to provide a final cleaning of the lens.

While data was obtained only for polysiloxane hydrogel contact lens materials, it is understood that supercritical fluids may be used for extracting any contact lens material. Therefore any lens-forming material can be employed in the present invention. The materials may be hydrophilic, or hydrophobic, or mixtures of both. The resulting contact lenses may be hard lenses as exemplified by the rigid acrylic plastics including poly(methyl methacrylate); or such contact lenses may be flexible, hydrophobic lenses exemplified by the unsubstituted and fluoro-substituted polyethylenes, the silicone elastomers, and the like; or such lenses may be soft hydrogel lenses.

It was further discovered that contact lenses could be subjected to SCF extraction while still in the mold in which the lens was cast. See Example 3. The complete lens-in-mold assembly was placed into the SCF pressurized chamber. Therefore, the SCF extraction technology can be used to effect dry lens release from the mold, which may be advantageous with respect to packaging and processing considerations. The method may be used to release any type of contact lens from molds made of any material, in which it was cast. Polyvinyl chloride and polypropylene are preferred mold materials with polypropylene being particularly preferred.

Often, contact lenses are released by contacting the lens and mold with a release solution, preferably by immersing the mold and lens assembly in the solution. This "wet" release step may be accomplished at room temperature, although in some cases it may be advantageous to conduct the release at other temperatures, for example, at an elevated bath temperatures up to about 125° C.

Following release of the lens from the mold, the lens is hydrated with water or buffered saline. Subsequently, the lens is sterilized such as by autoclaving in water or saline. These steps also effect removal of any residual isopropanol from the lens. As already mentioned, "wet" processing of contact lenses is labor intensive and may add to the cost of processing. Dry release, as facilitated by the present invention, would present an economically advantageous alternative to the known lens release methods.

The present invention further contemplates the use of supercritical fluid technology to facilitate the de-blocking procedures currently used for lathed contact lenses. If a contact lens edge or surface must be altered by using a lathe, the lens is often fixed or "blocked" to a holding implement, typically using a curable wax material. This material hardens and holds the lens in place while it is rotated at high speeds against the lathe. After the lathing is complete, the lens must be removed, or "de-blocked" from the holding implement. Ecologically unfavorable materials including chlorofluorocarbons (CFCs) were widely used for such de-blocking. After the de-blocking, the lenses must then be cleaned, followed by extraction procedures as already described. It is now thought that supercritical liquids including supercritical $CO_2$ could be used to dissolve the blocking wax while at the same time cleaning the lens and also removing residual materials from the lens.

The contact lenses treated by the processes of the present invention may be manufactured by the spincasting processes such as those disclosed in U.S. Pat. Nos. 3,408,429 and 3,496,254 and other conventional methods, such as compression molding as disclosed in U.S. Pat. Nos. 4,084,459 and 4,197,266.

Polymerization may be conducted either in a spinning mold, or a stationary mold corresponding to a desired contact lens shape. The obtained contact lens may be further subjected to a mechanical finishing, as desired. Also, the polymerization may be conducted in an appropriate mold or vessel to give a lens material in the form of button, plate or rod, which may then be processed (e.g., cut or polished via lathe or laser) to give a contact lens having a desired shape.

The hydrogels produced by the present invention are oxygen transporting, hydrolytically stable, biologically inert, and transparent. The monomers and copolymers employed in accordance with this invention, are readily polymerized to form three dimensional networks which permit the transport of oxygen and are optically clear, strong and hydrophilic.

The present invention provides materials which can be usefully employed for the fabrication of prostheses such as heart valves and intraocular lenses, as optical contact lenses or as films. More particularly, the present invention concerns contact lenses.

The present invention may further assist in the manufacture of materials which can be used for biomedical devices, such as, surgical devices, heart valves, vessel substitutes, intrauterine devices, membranes and other films, diaphragms, surgical implants, blood vessels, artificial ureters, artificial breast tissue and membranes intended to come into contact with body fluid outside of the body, e.g., membranes for kidney dialysis and heart/lung machines and the like, catheters, mouth guards, denture liners, intraocular devices, and especially contact lenses.

It is known that blood, for example, is readily and rapidly damaged when it comes into contact with artificial surfaces. The design of a synthetic surface which is antithrombogenic and nonhemolytic to blood is necessary for prostheses and devices used with blood.

The following Examples further illustrate various preferred embodiments of the invention. Although certain preferred embodiments have been described, it is understood that the invention is not limited thereto and modifications and variations would be evident to a person of ordinary skill in the art.

EXAMPLE 1

Determination of Super Critical Fluid Lens Extraction Efficiency

An experiment was designed to determine whether extraction of contact lenses would be enhanced by using supercritical fluids. Ten polysiloxane hydrogel lenses to serve as controls were extracted with isopropyl alcohol (IPA) and then water. The lenses were first placed in IPA at room temperature for 1 hour, followed by placement into a water tank at 85° C. for 4 hours. Ten polysiloxane hydrogel lenses were then extracted with super critical carbon dioxide ($CO_2$), in batches at various temperatures and pressures as shown below. Each ten lens batch, including the control was static extracted in 3 mL of tetrahydrofuran (THF) for a minimum of 24 hours. Four hundred microliters of the THF for each batch including the control were sequentially injected into the SEC. The total area of the distribution of the THF lens extract was used to determine the efficiency of the super critical fluid extractions as compared to the IPA-control extractions. The area of the test lens THF extracts were divided into the area of the control lens extract to give an extraction efficiency ratio (EER). The extraction efficiency ratios were determined by dividing the total area (normalized area) of the molecular weight distribution of the test lens THF extracts into the total area (normalized area) of the molecular weight distribution of the control lens THF extracts. The EER of the control lens was established to be 1.00. EER values greater than 1.00 are less efficient than the IPA extraction method; EER values less than 1.00 are more efficient. For each SCF $CO_2$ extraction, the chamber was filled with SCF $CO_2$ and purged 3 times with each purge/fill cycle lasting 1 hour.

The temperatures and pressures used for the super critical $CO_2$ extraction, areas from the SEC, and EER values are listed in Table 1.

TABLE 1

| Temp./Pressure(psi) | Area (SEC) | EER |
|---|---|---|
| Control | 24707992 | 1.00 |
| 50° C./2000 | 18817108 | 0.81 |
| 70° C./3000 | 18753486 | 0.81 |
| 80° C./2000 | 2093090 | 0.09 |
| 80° C./4000 | 24676496 | 1.08 |

EXAMPLE 2

A. SCF/Plasma Treatment

Ninety soft hydrogel contact lenses were made without initial plasma treatment. Twenty of these lenses were set aside leaving 70 lenses. The seventy lenses were supercritically extracted using $CO_2$ at 4500 psi, 60° C. The chamber was filled with supercritical $CO_2$ and purged 3 times with each filling/purge cycle lasting 1 hour. The seventy lenses were then plasma treated, followed by water extraction for 4 hours at 190° C. The plasma treatment protocol followed is as described immediately below.

Plasma Treating of Soft Hydrogel Cast Molded Contact Lenses

A plasma is a complex mixture of atoms and molecules in both ground and excited states which reach a steady state after the discharge has begun. The concentration of ions is about six orders of magnitude lower than neutrals. The primary reactants in an air or oxygen plasma are oxygen atoms. The action of an air plasma will cause primarily oxygen, and to a lesser extent nitrogen, incorporation into the polymeric structure of the material in the chamber. As is understood in the field, plasmas can be produced by passing an electrical discharge, usually at radio frequency through a gas at low pressure (0.005 to 5.0 torr). The applied RF power is absorbed by atoms and molecules in the gas state. The circulating electrical field causes these excited atoms and molecules to collide with one another as well as the walls of the chamber and the surface of the materials placed into the chamber. The lenses were removed from handling trays and placed concave side up on an aluminum coated tray. The tray was then placed into the plasma treatment chamber. The lenses were then treated in a direct current DC chamber. The chamber pressure was reduced to 0.1 torr and stabilized for at least 30 seconds. The lenses were treated at 400 watts for 4 minutes at 0.1 torr. The chamber was then backfilled to ambient pressure. The tray was then removed from the chamber, the lenses inverted and the procedure repeated to plasma treat the other side of the lens. Ten lenses were submitted for measurement of residual extractables in tetrahydrofuran (THF) and for measurement of physical characteristics.

B. Plasma Treatment/SCF

Soft hydrogel lenses were manufactured using plasma treatment. Ten lenses were set aside. Ten lenses were subjected to alcohol and water extractions to serve as control lenses. Another ten lenses were plasma treated, then subjected to supercritical $CO_2$ and THF extractions, using the same conditions as listed above in part A. The THF extracts were then evaluated for remaining extractables using Size Exclusion Chromatography (SEC) as set forth in Example 1 above. The following data was obtained. The weight column (wt) represents the starting total weight of 10 lenses. The column marked N.A. is the normalized average of lenses arrived at by dividing the weight into the area. The EER ratio is as described in Example 1 with the dry lenses accorded an arbitrary rating of 1.00 for comparative purposes. The final column represents the lens batches normalized to the IPA (isopropanol/$H_2O$ extracted lenses) control batch.

TABLE 2

| | Area(SEC) | wt | N.A. | EER | IPA |
|---|---|---|---|---|---|
| 1. Non-Extracted | 27362822 | 0.2153 | $1.27 \times 10^8$ | 1.00 | 6.00 |
| 2. IPA/$H_2O$ | 4386309 | 0.2092 | $2.10 a 10^7$ | 0.17 | 1.00 |
| 3. Plasma/SCF | 5687337 | 0.21436 | $2.65 \times 10^7$ | 0.21 | 1.26 |
| 4. SCF/Plasma | 4481289 | 0.21153 | $2.12 \times 10^7$ | 0.17 | 1.01 |

The physical characteristics of the lenses in groups 2, 3 and 4 were as follows:

| | IPA/$H_2O$ | Plasma/SCF | SCF/Plasma |
|---|---|---|---|
| Modulus (g/mm$^2$) | 91 | 110 | 105 |
| Elongation (%) | N/A | 70 | 63 |
| Tensile (g/mm$^2$) | N/A | 42 | 37 |
| Tear (g/mm) | 9 | 8 | 7 |

EXAMPLE 3

Description of Dry Release from Lens-In-Mold Assembly

A lens-in-mold assembly was placed in an upright position in the supercritical fluid chamber. The polysiloxane hydrogel contact lens was positioned in the polypropylene mold such that the concave side of the lens was exposed to the atmosphere. The chamber was filled with $CO_2$ and pressurized to 2000 psi at 50° C. for 1 hour. The chamber was purged of the $CO_2$ and replaced with fresh $CO_2$ 3 times. The chamber was then purged a final time and the lens-in mold-assembly was removed from the chamber. The lens remained in the mold but was clearly disengaged from the mold such that the lens dropped from the mold when the assembly was inverted. The lens appeared dimpled and hazy toward the center of the lens. However, inspection of the lenses following hydration revealed that the lenses dry released from the mold looked indistinguishable from lenses released from the mold via standard hydration.

Many other modifications and variations of the present invention are possible to the skilled practitioner in the field in light of the teachings herein. It is therefore understood that, within the scope of the claims, the present invention can be practiced other than as herein specifically described.

We claim:

1. In a method of dry releasing a contact lens from a mold in which the lens was molded, the improvement of which comprises treating the contact lens while still in the mold with a supercritical fluid.

2. The method of claim 1 wherein the supercritical fluid is selected from the group consisting of supercritical carbon dioxide, supercritical nitrous oxide, supercritical ethane and supercritical propane.

3. The method of claim 1 wherein the supercritical fluid comprises supercritical carbon dioxide.

4. The method of claim 3 wherein the supercritical carbon dioxide additionally comprises a compound selected from the group consisting of propanol, ethanol and methylene chloride.

5. A method of producing an optically clear contact lens comprising molding the lens from a monomeric mixture in a mold, and treating the contact lens while still in the mold and in a dry state with supercritical fluid, whereby the lens is disengaged from the mold, the supercritical fluid treatment comprising adding a fluid to a treatment chamber and bringing the fluid to a supercritical state within the chamber.

6. The method of claim 5, wherein the supercritical fluid comprises supercritical carbon dioxide.

7. The method of claim 6 wherein an additional compound is added to the supercritical carbon dioxide.

8. The method of claim 7 wherein the supercritical carbon dioxide further comprises at least one member selected from the group consisting of propanol, ethanol and methylene chloride.

9. The method of claim 8 wherein the supercritical carbon dioxide further comprises propanol.

10. The method of claim 5 wherein the contact lens is a soft hydrogel contact lens.

11. The method of claim 10 wherein the contact lens is a silicone hydrogel contact lens.

12. The method of claim 5 wherein residuals are extracted from the contact lens during the treatment with the supercritical fluid.

13. The method of claim 12, wherein the residual materials extracted from the lens with the supercritical fluid includes at least one member selected from the group consisting of organic solvents, unreacted monomers and oligomers.

14. The method of claim 8 wherein residuals are extracted from the contact lens during the treatment with the supercritical fluid.

* * * * *